W. A. LEE.
CABLE CLAMP.
APPLICATION FILED FEB. 26, 1920.
1,419,741. Patented June 13, 1922.
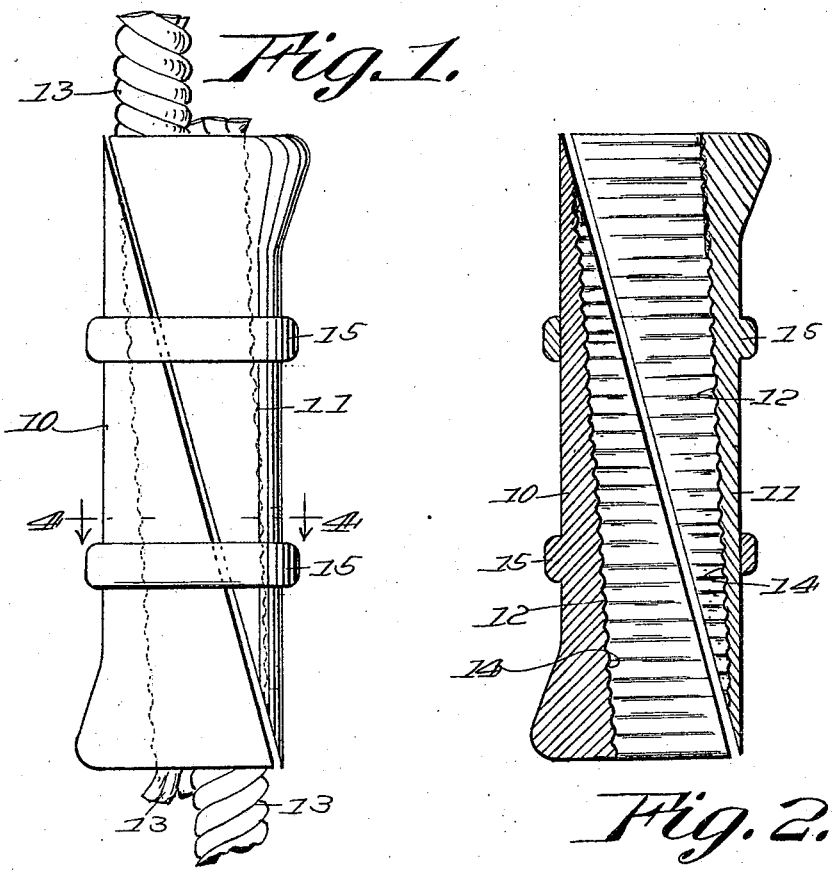
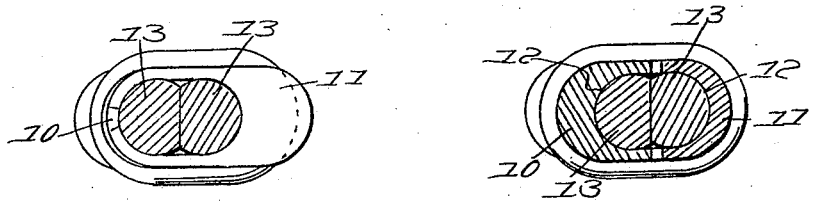

UNITED STATES PATENT OFFICE.

WILLIAM ALLEN LEE, OF CARGILE, ARKANSAS.

CABLE CLAMP.

1,419,741.  Specification of Letters Patent.  Patented June 13, 1922.

Application filed February 26, 1920. Serial No. 361,448.

*To all whom it may concern:*

Be it known that WILLIAM ALLEN LEE, a citizen of the United States of America, residing at Cargile, in the county of Union and State of Arkansas, has invented new and useful Improvements in Cable Clamps, of which the following is a specification.

The object of the invention is to provide a simple and inexpensve means for connecting the adjacent extremities of two cables or cable sections under such conditions as to provide for their ready attachment and locking against relative movement to produce in effect a continuous cable while providing for the disconnection thereof with equal facility, to avoid the disadvantages and loss of time incident to splicing the cable by the intertwisting or inter-engagement of the strands thereof, and with this object in view the invention consists in a construction and combination of parts of which a preferred embodiment is shown in the drawings, wherein:

Figure 1 is a side view of the clamp.

Figure 2 is a sectional view longitudinally of the same.

Figure 3 is an end view.

Figure 4 is a transverse section on the plane indicated by the line 4—4 of Figure 1.

The clamp consists essentially of independent or separable complemental oppositely tapered members 10 and 11 separated on a diagonal line and adapted when in their normal or operative relations to mutually form a longitudinal transversely elliptical or elongated seat 12 for the reception jointly of the overlapping extremities of two cables or cable sections 13 as indicated in Figure 1 and also in Figures 3 and 4; together with means whereby said members are held in relatively slidable relation to adapt them for relative longitudinal movement while preventing transverse or spreading movement thereof.

Interiorly these clamp members, on the surfaces of the seats 12 provided therein are corrugated or roughened as shown at 14 to increase the frictional engagement of the cable surfaces therewith, and the seats moreover are provided with obliquely disposed floors or bottoms produced by thickening the walls of the members in opposite directions toward the extremities of the same as indicated clearly in Figure 2 to the end that any tendency of the members to slide or move longitudinally with relation to each other will tend to compress the ends of the cable seated therein and thus more tightly clamp and lock the ends. The corrugation or roughening of the surfaces of the seat portions serves to cause any relative movement of the cable ends to carry the respective clamp members therewith.

In the construction illustrated each clamp member carries a fixed, preferably integral guide loop 15 located, for example, near the larger end of the member and extended to receive the smaller or reduced end of the other member. Thus in applying the clamp to the overlapped extremities of the cable to be spliced or secured the members, previously separated, may be moved longitudinally toward each other to cause the engagement of the reduced end of each member with the guide loop carried by the other member, and after this longitudinal movement has progressed relatively to a sufficient extent to bring the surfaces of the overlapping ends of the cable into frictional engagement with the corrugated or roughened surfaces of the seats, any further tightening of the members to properly compress and lock the cable ends together and in place in the clamp will be effected by any tendency of said cable ends to move longitudinally in the direction of engagement of the clamp members. The clamping action, in other words, will be increased in proportion to the strain applied longitudinally to the cables or in the direction serving to test the tensile strength of the cable. The disengagement of the cable ends may be effected by a reverse longitudinal movement serving to move the clamp members toward their enlarged ends.

What is claimed is:

A clamp for the purpose indicated consisting of independent complemental oppositely tapered members separated on a diagonal line and adapted when in operative relations to mutually form a longitudinal transversely elliptical seat for the reception jointly of the overlapping extremities of two cables, the members being corrugated in the seat to increase the frictional engagement of the cable surfaces therewith and each member having an integral guide loop located near its larger end and extended to receive the smaller end of the complemental member.

In testimony whereof he affixes his signature.

WILLIAM ALLEN LEE.